EMILIE A. BEARDSLEY.
Kettle-Covers.
No. 151,464. Patented June 2, 1874.
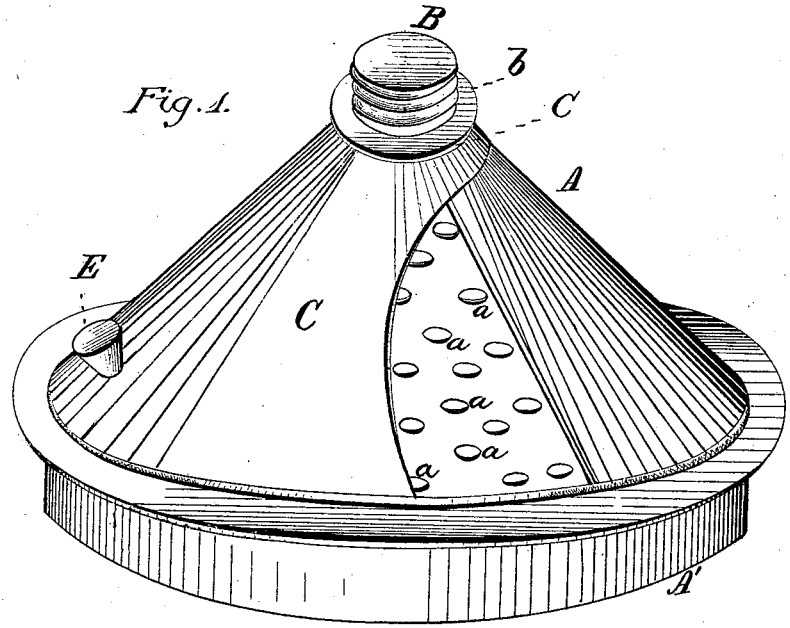
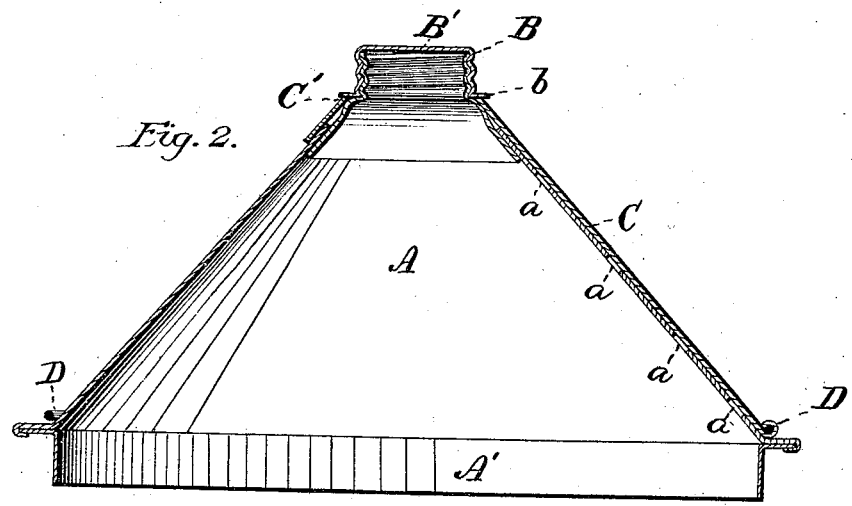
WITNESSES.
W. T. Newman
Wm H Brereton Jr
INVENTOR.
Emilie A Beardsley,
By Leggett & Leggett.
Attorneys.

UNITED STATES PATENT OFFICE.

EMILIE A. BEARDSLEY, OF CANASERAGA, NEW YORK.

IMPROVEMENT IN KETTLE-COVERS.

Specification forming part of Letters Patent No. 151,464, dated June 2, 1874; application filed April 22, 1874.

*To all whom it may concern:*

Be it known that I, EMILIE A. BEARDSLEY, of Canaseraga, in the county of Allegany and State of New York, have invented certain new and useful Improvements in Pot and Kettle Cover, Colander, &c.; and I do hereby declare the following to be a full, clear, and exact description of the invention, such as will enable others skilled in the art to which it pertains to make and use it, reference being had to the accompanying drawings, which form part of this specification:

My invention relates to an improvement in kitchen utensils, and unites in itself the functions of a pot-cover, a steamer, and a colander.

In the drawings, Figure 1 is an isometric view of my invention, and Fig. 2 a cross-section of the same.

My invention consists in the following parts and combination, as hereinafter set forth and claimed, wherein—

A is a plate, made conical, flat, spherical, or any other appropriate or desired shape. Upon a portion—say one-half—of the surface of the plate A are made perforations *a*. In the center of the plate A is placed the male screw-thread B, upon which is screwed the cap B', provided with a flange, *b*. A' is a collar or cylinder, attached to the rim of the plate A. C is a plate, formed in correspondence with the plate A, made large enough to cover only a portion—say one-half—of the plate A. This plate C is provided with a hole, C', through which passes the male screw B. The edge of the plate C is attached to a ring, D, of wire or other suitable material. The plate C is provided with a suitable handle, E. This plate may be placed on the inside, if preferred.

The several parts constituting my device are combined and united as shown in the drawings.

It will be seen that by rotating the plate C by means of its handle, all or part of the perforations *a* in the plate A may be exposed, or they may be completely covered by the plate C, and the device present a closed surface.

This is intended to regulate the amount of steam escaping from a pot or vessel, when my device is used as a cover for the same, by uncovering more or less of the perforations *a*.

To use my device as a steamer it may be inverted, and placed over boiling water, and the article to be steamed placed in my device, when steam can be admitted by uncovering the perforations A by operating the plate C.

The use of my device as a colander is sufficiently obvious to waive any special description.

It is obvious that the different parts of my invention can be easily and quickly separated and removed for the purpose of cleaning.

I claim as my invention—

The combination of the plate A, plate C, screw B, and flanged screw-cap B', substantially as and for the purpose shown.

In testimony that I claim the foregoing I have hereunto set my hand this 18th day of April, 1874.

EMILIE A. BEARDSLEY.

Witnesses:
PHILO S. CARPENTER,
BARNARD C. ROUP.